Patented Sept. 9, 1947

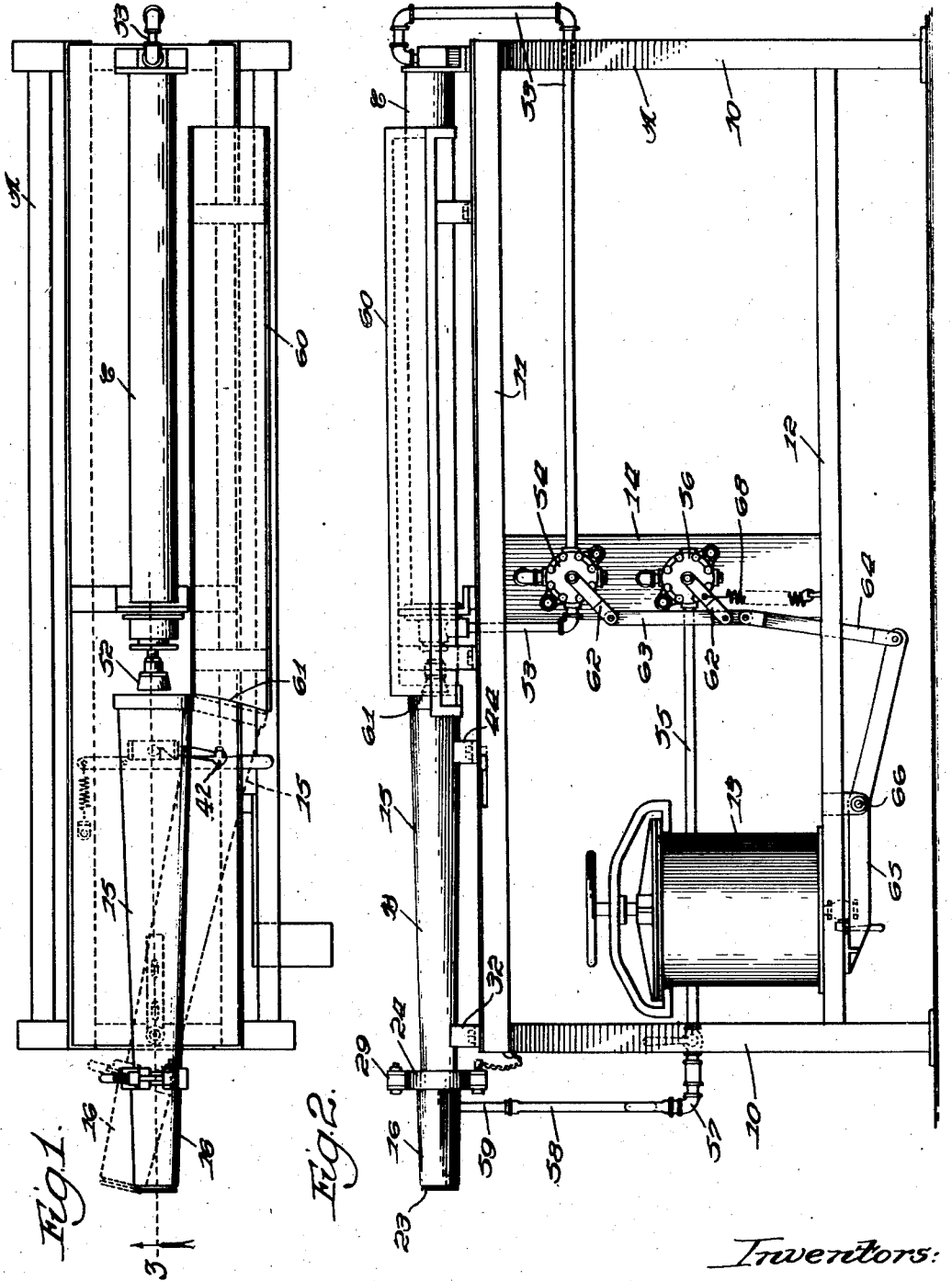

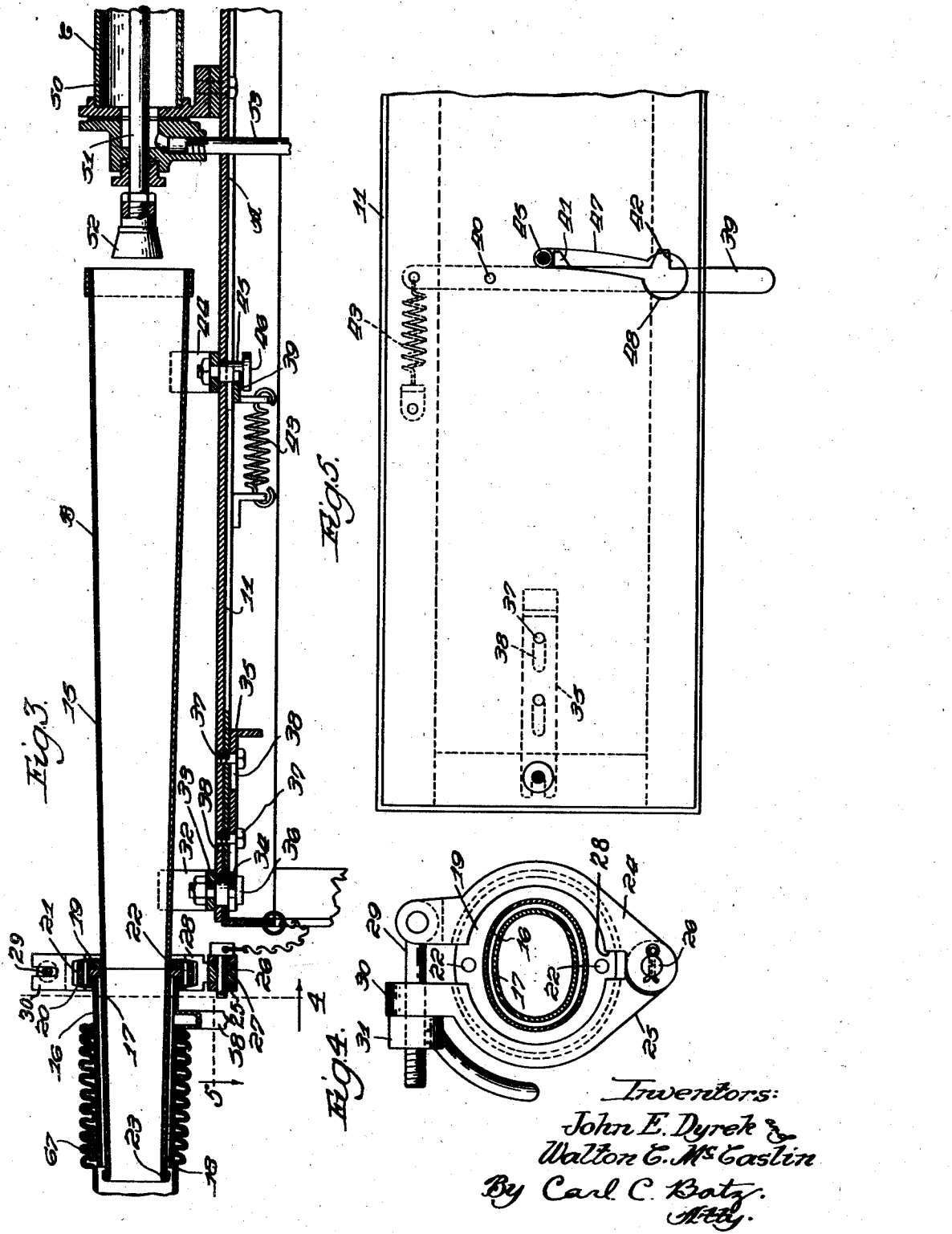

2,427,202

UNITED STATES PATENT OFFICE 2,427,202

APPARATUS FOR STUFFING CASINGS

John E. Dyrek and Walton L. McCaslin, Chicago, Ill., assignors to Armour and Company, Chicago, Ill., a corporation of Illinois Application March 19, 1941, Serial No. 384,128

6 Claims. (Cl. 17—39)

This invention relates to apparatus for stuffing casings and the like.

An object of the invention is to provide apparatus by means of which casings can be quickly and efficiently filled. A further object is to provide simple and effective means for removing air and moisture from meat as it is being stuffed into a casing. A further object is to provide apparatus whereby casings, either natural or artificial, may be readily stuffed, while at the same time withdrawing air and moisture from the meat and trapping out the objectionable materials withdrawn with the exhausted air. Other specific objects and advantages will appear as the specification proceeds.

The invention is illustrated, in a preferred embodiment, by the accompanying drawings, in which—

Figure 1 is a top plan view of apparatus embodying our invention; Fig. 2, a side view in elevation; Fig. 3, a longitudinal sectional view, the section being taken as indicated at line 3 of Fig. 1; Fig. 4, a transverse detail sectional view, the section being taken as indicated at line 4 of Fig. 3; and Fig. 5, a plan detail sectional view, the section being taken as indicated at line 5 of Fig. 3.

In the illustration given, A designates a frame; B, a stuffing horn; and C, power apparatus for forcing the meat or other material into the casing.

The frame A comprises the standards 10, a platform 11 supported thereby, a second platform 12 supporting a trap 13, and a vertical frame member 14 which is employed as a support for valves which will be hereinafter described.

The horn B may be formed of one or several parts. In the illustration given, the horn comprises a rear portion 15 and a forward casing-receiving portion 16. Within the nozzle or casing-receiving portion 16 is an inner horn member 17 providing a vacuum chamber or passage 18 between the two parts. The forward end of rear portion 15 is provided with a flange 19, and the rearward portion of the member 16 is provided with a flange 20. The inner member 17 is provided with a flange 21 received between flanges 19 and 20. The flanges are provided with aligned openings through which headless pins 22 are passed.

The inner horn member 17 has its forward end portion turned back upon itself to form a lip or baffle 23. It is important that the inner member 17 project about 1/16 of an inch beyond the outer horn member 16, this extension being substantially critical in that it enables air to be removed without withdrawing the juices from the meat.

The flange members 19, 20 and 21, as illustrated in Figs. 3 and 4, are releasably held together by a clamping structure which will now be described. The two clamping members 24 and 25 are pivotally secured together by a pin 26, one end of the member 24 being furcated to receive the tongue 27 of the member 25. Each of the members 24 and 25 is provided with a pair of curved arms 28 adapted to receive the three flanges 19, 20 and 21. The upper end of the member 24 is provided with a locking bolt 29 pivotally supported thereon. The bolt extends through a slot within the ear 30 carried by the member 25. A nut 31 releasably locks the members 24 and 25 in confining relation to the three flanges 19, 20 and 21.

The stuffing horn B is pivotally mounted upon the platform 11 of frame A. A U-shaped strap 32 has its free ends welded to the rear horn portion 15, and the lower portion 33 thereof rests upon the platform 11 for rotation thereon. A bolt 34 extends through the strap portion 33 and below the platform 11, being held in place therebelow by a slide latch 35, the latch 35 being bifurcated near its end so as to releasably engage the head 36 of the bolt 34. The slide member 35 is held in place by two screws 37, which pass through slots 38 in the latch member.

With the horn B pivoted, as above described, the pivotal support being near the forward end of the horn, the rear portion of the horn can be swung laterally for the purpose of filling, etc. Means are provided for releasably latching the horn in the position desired for the stuffing operation and in another lateral position for filling. The latch structure is best illustrated in Figs. 3 and 5. A latch bar 39 is pivoted at 40 and is provided with two latch lugs 41 and 42. A spring 43 draws one end of the latch member 39 in a forward direction. This urges the handle portion of the member 39 in a rearwardly direction. The horn portion 15 is provided at its rear with a U-shaped strap 44, identical with the strap 32 already described. A bolt member 45 extends through the platform 11 and is provided with an enlarged head 46. The action of the member 39 under the influence of the spring 43 serves to latch the bolt 45 and thereby the horn portion 15 in each extremity of its movement. The bolt 45 extends through an arcuate slot 47 which terminates in an enlarged opening 48, the opening being sufficient to permit the withdrawal of the head 46.

It will be noted that the horn B can be readily removed from the machine by drawing the forward latch 35 and by retracting the rear latch 39. At the same time, opening the clamping members 24 and 25 permits the bolt 29 to be swung forwardly to enable the members 24 and 25 to release the flanges 19, 20 and 21.

The apparatus C, as here illustrated, comprises a compressed air cylinder 50 which is closed at each end, and at one end is provided with means for guiding a plunger member 51 to which the piston of the cylinder is secured. At the front end, the plunger carries a head 52 adapted to push the meat or other material forwardly through the horn 15. A compressed air line 53 communicates with each end of the cylinder and is controlled by a valve 54. A suction line 55 is controlled by valve 56 and leads to any suitable source of suction. The suction line 55 passes through a trap 13, which is described in greater detail in a copending application of John E. Dyreck, Serial No. 345,039, filed July 12, 1940, for Method and apparatus for stuffing meats into casings, which has issued as Patent No. 2,313,229, dated March 9, 1943. Beyond the trap there extends a suction line 57 to which is connected a flexible pipe coupling 58 of rubber or other suitable material. The upper end of pipe 58 is secured to a rigid pipe 59 communicating with the suction passage 18 between the members 16 and 17, as shown more clearly in Fig. 3.

In order to expedite the feeding of the horn and to feed the same more accurately, we have provided a trough 60, which is preferably open at its front end and which is adapted to receive meat or other material to be passed into the horn. Preferably, the front end of the trough 60 is slightly curved, as indicated at 61, so as to permit the rear end of the horn 15 to swing into a closed position aligned with the mouth of the trough 60, as indicated more clearly in Fig. 1.

The two valves 54 and 56 are each provided with a lever 62 controlled by a common link 63. A second link 64 connects the lower portion of link 63 to a treadle member 65 pivoted upon the pin 66. The valve openings are so positioned as to cause a suction to be created in the line 55 slightly before compressed air is admitted into either of the lines 53.

*Operation*

In the operation of the device, the casing, indicated by the numeral 67, may be drawn over the member 16, as illustrated in Fig. 3, the casing being gathered thereon as illustrated. To fill the horn, the same is swung laterally, as indicated in Fig. 1, to bring the mouth of the horn into alignment with the open end of the receptacle or trough 60. The stuffing material within the receptacle is pushed forwardly to fill the horn 15 to the desired extent. Then the horn is swung back to the position indicated in full lines in Fig. 1, and the treadle member 65 operated. First, a slight suction is created within the chamber 18, and then the flow of compressed air to the rear end of the power cylinder C causes the head 52 to move forwardly and carry the stuffing material into the casing, the casing being allowed to move forwardly as filled. Upon release of the treadle 65, spring 68 draws the lever members to the position shown in Fig. 2, and the compressed air flows to the forward end of the cylinder to bring about the retraction of the piston head 52 to the position shown in Fig. 3. At the same time, valve 56 closes off the vacuum. Thus, by a single movement of the treadle 65, the above operations automatically follow.

As the horn B is swung to either filling position or stuffing position, the latch 39 locks it in the desired position. Release is effected by moving the handle portion of the latch 39.

By means of the foregoing steps, the operator can quickly fill casings, the steps of loading the horn and swinging it back to stuffing position being accomplished in an extremely brief time, and the remaining operations being automatic.

If it is desired to remove the forward portion 16 and inner member 17 of the horn B, this may be accomplished by loosening the nut 31 and swinging the bolt 29 free of the ear 30 and then swinging the members 24 and 25 outwardly. The flanges 19, 20 and 21 may then be separated since the pins 22 are headless.

To remove the rear portion 15 of the horn from engagement with the platform 11, it is only necessary to swing the member 15 to the filling position and then release the latch 39 and draw rearwardly the latch 35. The two strap members 32 and 44 may then be lifted upwardly to free the member 15.

The apparatus is extremely simple and accurate in operation, permitting the stuffing operation to be carried on in a modicum of time while at the same time greatly improving the finished product through the bringing about of the removal of air, gases, etc. The tedious operations heretofore necessary are eliminated and the steps carried on to a substantial extent automatically.

While in the foregoing specification, we have set forth certain specific steps and certain details of structure, it will be understood that such steps and details may be widely varied by those skilled in the art without departing from the spirit of our invention.

We claim:

1. In apparatus for stuffing casings, a stuffing horn provided with a double-walled portion adapted to receive the open end of a casing, a source of suction connected to the space between said walls so as to subject the interior of said casing to suction, a frame, means for supporting said horn thereon for movement into a plurality of positions, means for filling said horn when in one position, and means for stuffing a casing when in another position.

2. In apparatus for stuffing casings, a stuffing horn adapted to receive the open end of a casing, said stuffing horn comprising an outer tube and an inner tube, suction means communicating with the space between said tubes, plunger means for pressing material through said tube and into said casing, a power cylinder for operating said plunger means, means for passing motive fluid into said power cylinder to operate said plunger, a source of suction, a valve controlling said motive fluid, a valve controlling the flow from said stuffing horn to said source of suction, and treadle means for operating each of said valves in sequence to admit suction and then to operate said plunger.

3. In apparatus for stuffing casings, a stuffing horn adapted to receive the open end of a casing, said stuffing horn comprising an outer tube and an inner tube, suction means communicating with the space between said tubes, plunger means for pressing material through said tube and into said casing, a power cylinder for operating said plunger means, means for passing motive fluid into said power cylinder to operate said plunger, a source of suction, a valve controlling said motive fluid, a valve controlling the flow from said stuffing horn to said source of suction, and treadle means for operating each of said valves in sequence to admit suction and then to operate said plunger, said means including also automatic means for closing said suction and admitting fluid to retract said plunger when said treadle is released.

4. In stuffing apparatus of the class set forth, a frame, a stuffing horn adapted to receive the open end of a casing and movably supported upon said frame, said horn having a double wall structure providing a vacuum chamber therebetween, a vacuum line leading from a source of suction, a flexible tube connecting said vacuum line to said vacuum chamber, means for filling said horn when the same is moved to one position, and means for stuffing material from said horn into said casing when the same is moved to another position.

5. In apparatus for stuffing casings, a stuffing horn having one end thereof adapted to receive the open end of a casing and having also an enlarged feed end, means for pivotally supporting said horn to permit the feed end thereof to move into a least two positions, means for stuffing said casing when the horn is in one of said positions, a feed receptacle, said horn being movable from said one position to the other of said positions in which its feed end is adjacent said receptacle, and guide means limiting the movement of said horn to bring the same into said two positions.

6. In apparatus for stuffing casings, a casing horn having a feed end and having its other end adapted to receive one end of a casing, means for pivotally supporting said horn to permit the feed end thereof to move into at least two positions, a filling receptacle supported laterally of said pivot and having an open end adjacent the feed end of said horn when the same is swung to one of said positions, means for stuffing said casing when the horn is swung into the other of said positions, means for guiding said horn in its movement from one to the other of said positions, and means for releasably locking said horn in each of said positions.

JOHN E. DYREK.
WALTON L. McCASLIN.

REFERENCES CITED

The following references are of record in the file of this patent:

UNITED STATES PATENTS

| Number | Name | Date |
| --- | --- | --- |
| 31,030 | Nittinger | Jan. 1, 1861 |
| 95,891 | Flansburgh | Oct. 19, 1869 |
| 133,342 | Silver | Nov. 26, 1872 |
| 1,450,104 | Merli et al. | Mar. 27, 1923 |
| 1,719,806 | Jeffrey et al. | July 2, 1929 |
| 2,313,229 | Dyrek | Mar. 9, 1943 |

FOREIGN PATENTS

| Number | Country | Date |
| --- | --- | --- |
| 144,791 | Great Britain | June 15, 1920 |